United States Patent

[11] 3,593,076

| [72] | Inventors | Lloyd W. McSparran<br>Erie;<br>Russell M. Smith, North East, both of, Pa. |
|---|---|---|
| [21] | Appl. No. | 7,786 |
| [22] | Filed | Feb. 2, 1970 |
| [45] | Patented | July 13, 1971 |
| [73] | Assignee | General Electric Company |

[54] WHEEL SLIP CONTROL ARRANGEMENT
16 Claims, 3 Drawing Figs.

[52] U.S. Cl............................................ 318/52,
290/14, 318/144, 318/158, 322/26, 322/28
[51] Int. Cl................................................ B61c 15/12
[50] Field of Search......................................... 318/52,
144, 158; 322/26, 28, 80, 83; 290/11, 14, 45

[56] References Cited
UNITED STATES PATENTS

| 2,367,919 | 1/1945 | Baston et al. | 318/52 |
| 3,117,264 | 1/1964 | Smith | 318/52 |
| 3,183,422 | 5/1965 | Stamm | 318/52 |
| 3,263,142 | 7/1966 | Adoutte et al. | 290/14 X |
| 3,525,924 | 8/1970 | Atterhold | 322/28 |

Primary Examiner—Oris L. Rader
Assistant Examiner—H. Huberfeld
Attorneys—Walter C. Bernkopf, Frank L. Neuhauser, Oscar B. Waddell and Joseph B. Forman ABSTRACT: A wheel slip control arrangement for traction vehicles wherein a pair of DC series field traction motors are connected in series by a common junction. A plurality of such pairs are preferably connected in parallel across the output of the traction generator with their common junctions being interconnected. A voltage responsive circuit and current responsive actuating device, such as a light emission device, are connected in a circuit between the common junction and the output of a voltage reference circuit whereby the device is actuated by a time derivative of the voltage difference between the common junction and the output of the reference circuit. The disclosed circuit includes a bridge rectifier whose output is connected in series circuit with a semiconductor device and the light emitting diode. The semiconductor device is gated on by voltage variations coupled by capacitance means to its control electrode. A control circuit electrically insulated from the above described circuitry is responsive to the output of the light emission device to modify the excitation of the traction generator.

INVENTORS
LLOYD W. McSPARRAN
RUSSELL M. SMITH
Walter C. Bernkopf
THEIR ATTORNEY

WHEEL SLIP CONTROL ARRANGEMENT

This invention relates to an electric circuit arrangement for controlling wheel slip in traction vehicles utilizing traction motors connected in series parallel connection.

Electrically driven traction vehicles, such as locomotives, of the type wherein a plurality of wheel driving axles are driven by separate motors commonly encounter slipping of wheels due to bad track conditions or other reasons. Slipping is particularly encountered at low speed operation when the applied tractive effort is proportionately higher than during operation at high speeds and can readily exceed the adhesion between the wheels and rails. In addition, slipping at low speeds is more likely to result in a runaway condition wherein the slipping motor rapidly increases its speed. The latter phenomena is partially attributable to the conventional series parallel motor connection utilized for low speed operation. Greater tractive effort is attainable from a plurality of serially connected motor pairs than from motors connected in simple parallel circuit across a source of limited current rating. However, the tractive effort of a slipping motor decreases less rapidly with an increase in slipping speed when connected in such a series parallel circuit than when connected in simple parallel. Therefore, in the series parallel case more tractive effort or torque is available to produce undesirable acceleration of the slipping motor.

Various wheel slip control arrangements have been utilized to alleviate this condition. These commonly sense wheel slippage, by a comparison of axle speeds or of certain traction motor parameters, and upon sensing a wheel slip initiate remedial action, such as temporarily reducing the available traction power and/or applying sand to the rails. Wheel slip arrangements are subject to stringent demands particularly in low speed locomotive operation, such as in "drag" type freight service. "Drag" service trains are operated at relatively low speeds by locomotives of modest total horsepower. Wheel slipping commonly occurs because of rail conditions and the phenomena of weight shifting, whereby the wheels having the lighter contact pressure on the rail have a tendency to slip with respect to the wheels of the heavier loaded axle. The slipping wheels contribute only slightly to the net tractive effort. The resulting reduction in tractive effort is supplemented by the reduction of traction power resulting from the corrective action of wheel slip control systems. This cumulative action can result in a reduction of train speed, particularly if it occurs when the train ascends a grade. Speed reduction usually produces a proportionally higher tractive effort and increased slip tendencies. This action, therefore, reduces the ability to maintain speed, to climb grades and can also result in excessive wheel wear.

It has been previously proposed to interconnect the plural junctions of serially connected motor pairs by an equalizing connection termed a power tie. With this type of connection, the tractive effort of the slipping motor decreases more rapidly with an increase of slipping speed. Accordingly, the slipping motor tends to initially accelerate less than in the case of a series parallel arrangement without power tie. However, a supplementary wheel slip control arrangement is required to assure that the slip will be arrested. This control arrangement must satisfy plural requirements which are only partially met by various conventional systems. The control arrangement must rapidly sense minor variations in the speeds of various axles, or in the voltages or currents of the associated traction motors in order to minimize the power reduction required to correct the slip. Correction must not only initiate rapidly but must also terminate immediately upon termination of the slip so as to prevent any excessive reduction of traction power. It is also desirable for the control arrangement to sense unbalanced conditions of persisting nature, such as those caused by motor failures. An additional important requirement is the ability to sense, and correct for, the simultaneous slippage of a plurality of axles. It is well known that slippage of one axle can induce other axles to slip. This phenomena can readily occur with the above-described series parallel connection utilizing a power tie. However, some conventional wheel slip arrangements rely on a comparison of motor currents of traction motors associated with two specific axles and are therefore insensitive to simultaneous slips.

Accordingly it is an object of this invention to provide an arrangement for maximizing tractive effort by rapid detection and correction of wheel slips in traction vehicles wherein DC traction motors are connected in series parallel combination.

It is a further object to provide such an arrangement which does not require complex and costly sensing components and additional power sources while providing satisfactory operation in accordance to established safety standards.

It is yet a further object of this invention to correct wheel slippage without an excessive reduction of traction power to minimize potential reductions in train momentum and to provide such a correction upon the slippage of one or more axles of the locomotive.

The present invention is directed to traction vehicles wherein traction motors are connected in series parallel across a source of DC potential. The junctions between the serially connected motors are preferably interconnected by a power tie. A voltage divider network connected across the source provides a point of reference potential. Sensing means compare the voltage between the reference point and the power tie whereby voltage deviations, or the time derivatives of the voltage deviation above predetermined amplitudes rapidly actuate means for decreasing the output power of the source of DC potential. Provision is made for rapid initiation of power restoration upon cessation of the voltage difference.

In further accord with the invention the voltage deviation and the time derivative of the voltage deviation actuate light emission from a component connected in the sensing circuit, which emission is detected by another component in a low voltage circuit which in turn switches on the wheel slip corrective action.

The novel features believed characteristic of this invention are set forth with particularity in the appended claims. The invention itself, however, both as to its organization and method of operation, together with further objects and advantages thereof, can best be understood by referring to the following description when taken in connection with the following drawings wherein:

Figure 1:
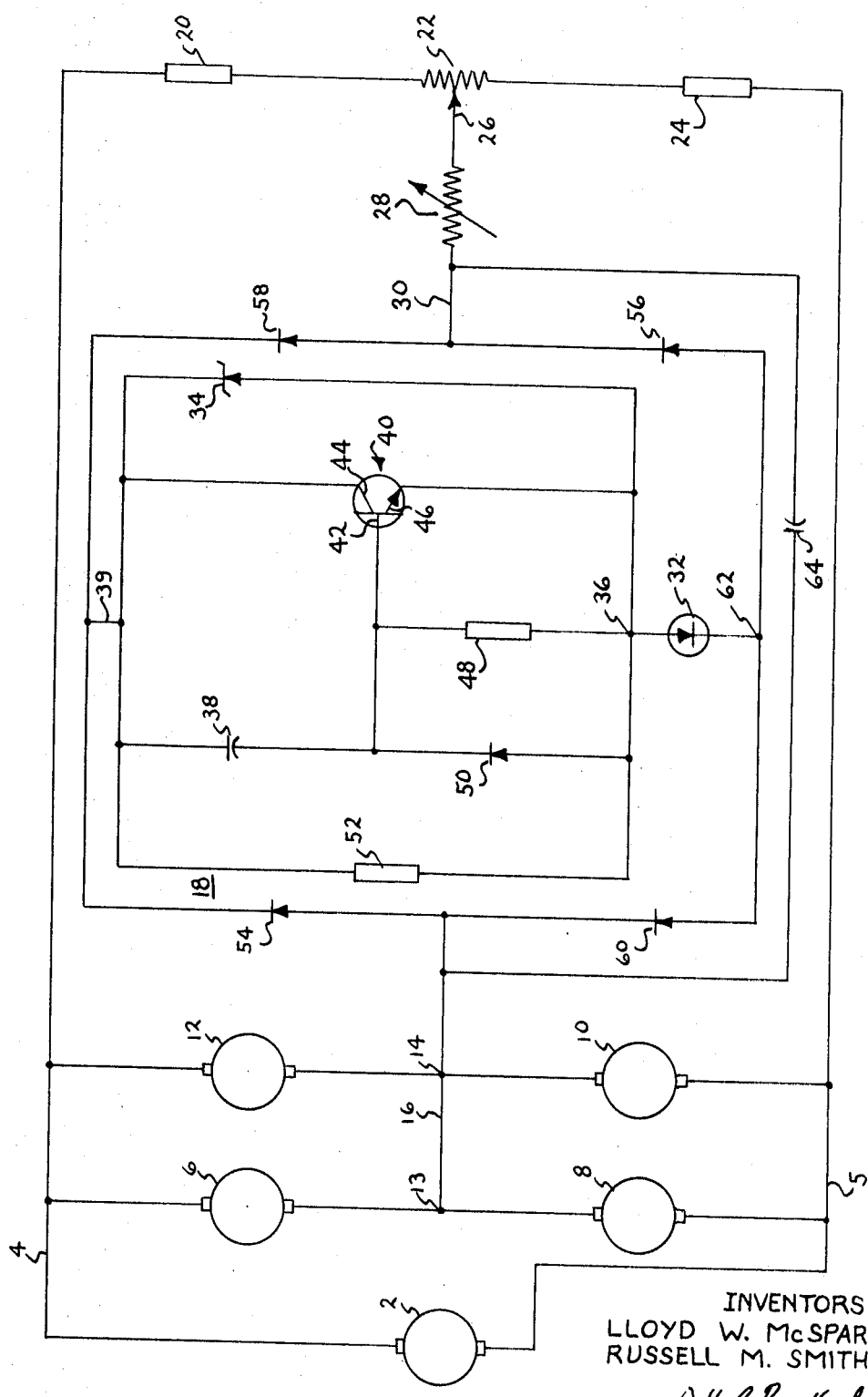
FIG. 1 illustrates a schematic circuit diagram of a first portion of the wheel slip control arrangement of the present invention comprising circuitry connected to the source of DC potential supplying the traction motors.

Referring to FIG. 1, there is illustrated a traction generator 2 whose positive and negative output terminals are connected, respectively, to lines 4 and 5. Traction motors 6, 8, 10 and 12 are of the series field type and are connected in series parallel combination across lines 4 and 5. Motors 6 and 8 are serially connected across lines 4 and 5 so as to form a first series pair. Motors 12 and 10 are similarly connected so as to form a second series pair. The junctions 13 and 14, intermediate to the serially connected motors, are interconnected by means of a power tie 16. It should, of course, be understood that additional serially connected motor pairs may be used with their junctions interconnected to the common power tie.

If it is assumed that motors 6 and 8 drive, respectively, the leading and lagging axles of the forward truck of a locomotive, and that motors 10 and 12, respectively, drive the leading and lagging axles of the rear truck of the locomotive, motor 12 should be connected in parallel with motor 6 in the manner illustrated. Motor 6, in view of its association with the front axle, is the most likely one to encounter slipping. It motor 6 slips, the motor connected in parallel therewith may be induced to slip in view of the current division through the power tie. Therefore, this motor should be the one which drives the axle which is least likely to slip, i.e. the rear axle of the second truck.

If, for example, motor 6 commences to slip, its speed and thus its armature voltage will increase so as to reduce its armature current. Were it not for the power tie this would result in a corresponding reduction in the current through motor 8 and a decrease of its armature voltage. This would further increase the armature voltage of motor 6 and result in a cumulative acceleration of that motor. The power tie, however, causes the voltage across motor 12 to increase as the armature voltage of motor 6 increases. This requires motor 12 to draw a higher current which it obtains from motor 8 and the power tie. The power tie thus limits the reduction of armature current and armature voltage of motor 8, and reduces the acceleration of the slipping motor. The power tie current, however, strengthens the torque of the motor 12 which is thus also subject to slip. Therefore, the wheel slip control arrangement must have the ability to sense simultaneous slipping of a plurality of motors. Certain prior art wheel slip sensing arrangements rely on detecting differences between parameters of two traction motors and are, therefore, not desirable. Instead, wheel slip is sensed by comparing the voltage at the power tie 16 with a reference voltage which varies proportionately with the output voltage of the traction generator. The reference voltage is obtained from arm 26 of potentiometer 22 which is connected in series circuit with resistor 20 and resistor 24 across power lines 4 and 5. The voltage at arm 26 of the voltage divider is preferably maintained at a midpoint between the voltages on lines 4 and 5.

A detection circuit 18, current responsive actuating means 32, a bridge rectifier circuit and a sensitivity adjustment potentiometer 28 are connected in series circuit between the power tie 16 and voltage reference arm 26 of potentiometer 22. Diodes 54, 56, 58 and 60 of the bridge rectifier are connected so that the junctions of diodes 54 and 60, constituting a first input terminal, are connected to the power tie. The junction of diodes 58 and 60, constituting a second input terminal 30, are connected in series with potentiometer 28 to arm 26. The junction of diodes 54 and 58, constitute a first output terminal 39 and the junction of diodes 60 and 56 constitute a second output terminal, 62, of the bridge. The voltage responsive circuit 18 and diode 32 are serially connected between output terminals 39 and 62. The diode network in poled so that voltage deviations of the power tie in respect to the reference voltage terminal will, irrespective of polarity, produce a positive potential at junction 39 in respect to line 36.

The detection circuit 18 detects the time derivative of the voltage deviations at the power tie, which is indicative of incipient wheel slip, and additionally detects excessive differences of potential between the power tie and the reference point which may occur in the case of motor failures or simultaneous slipping of a plurality of motors. Either indication will cause current to flow through actuating device 32 which initiates wheel slip correction. Circuit 18 comprises components 34, 38, 40, 48, 50 and 52. Capacitor 38 is connected from junction 39 to base 42 of transistor 40 whose collector 44 is connected to line 39 and whose emitter 46 is connected to line 36. This transistor is normally cut off and resistor 48, connected from its base 42 to line 36, limits transistor 40 collector to emitter leakage current. A rapid voltage change at the power tie, in reference to arm 26, is coupled by capacitor 38 to base 42 so as to initiate base current flow. The emitter current causes device 32 to be actuated. The resulting collector to emitter current corresponds to the product of the base current and the current gain of the transistor. If it is assumed that the power tie voltage increases so as to become more positive than the voltage at arm 26, the current flows from the power tie through diode 54, the detector circuit 18, the actuating device 32, junction 62, diode 56, and potentiometer 28 to arm 26. Conversely if the potential at arm 26 is more positive than the potential at the power tie the current flows from arm 26 through potentiometer 28, diode 58, the detection circuit 18, actuating device 32, and diode 60 to the power tie. The potential at the power tie varies at a rate determined primarily by the magnitude of the adhesion loss between the vehicle wheels and the rail and by the inertia of the motor, armature, gear train, and slipping axle. The magnitude of capacitor 32 can be selected accordingly to the preferred minimum rate of potential change which will cause actuation of device 32. Since slips may repeat at frequent intervals, it is essential that capacitor 38 be discharged very quickly. This is achieved by diode 50 and resistor 52 which are serially connected across capacitor 38. Potentiometer 28 provides a sensitivity adjustment and is normally adjusted so as to prevent any actuation of device 32 by random noise. Capacitor 64 connected between the power tie and potentiometer 28 also serves to filter out noise components.

In addition to detecting the time derivative of the variation in voltage, it is also desirable to detect excessive voltage differences between the power tie and arm 26. For this purpose a breakdown device 34 is connected across terminals 36 and 39. This device, which may be a zener diode, is selected to have a breakdown potential which is slightly in excess of normal voltage unbalances which may be caused by acceptable differences in wheel diameter, motor parameters and cable resistances. In case the voltage unbalance between terminals 36 and 39 exceeds the breakdown voltage, conduction will take place through diode 32 in the same manner as previously explained.

Since the above-described sensing and actuating arrangement is connected in circuit with the traction generator whose output potential may be substantially in excess of 1,000 volts, normal safety precautions as well as governmental regulations require adequate voltage isolation between this circuit and low potential circuits which provide wheel slip control in response to the output of device 32. For this purpose it has been found desirable to utilize a light emitting diode as the actuating means 32. Such devices may be actuated by extremely low currents and voltages, i.e. less than 1 milliampere and less than 1½ volts and have adequate stability for this purpose. The light emitting device 32 cooperates with a light detecting device in an additional portion of the control circuitry which is subsequently described. Light emission and detection devices respond very rapidly and meet the required isolation requirements. They offer additional advantages over other types of coupling devices. For example, saturable reactance devices require additional AC voltage sources.

Figure 2:
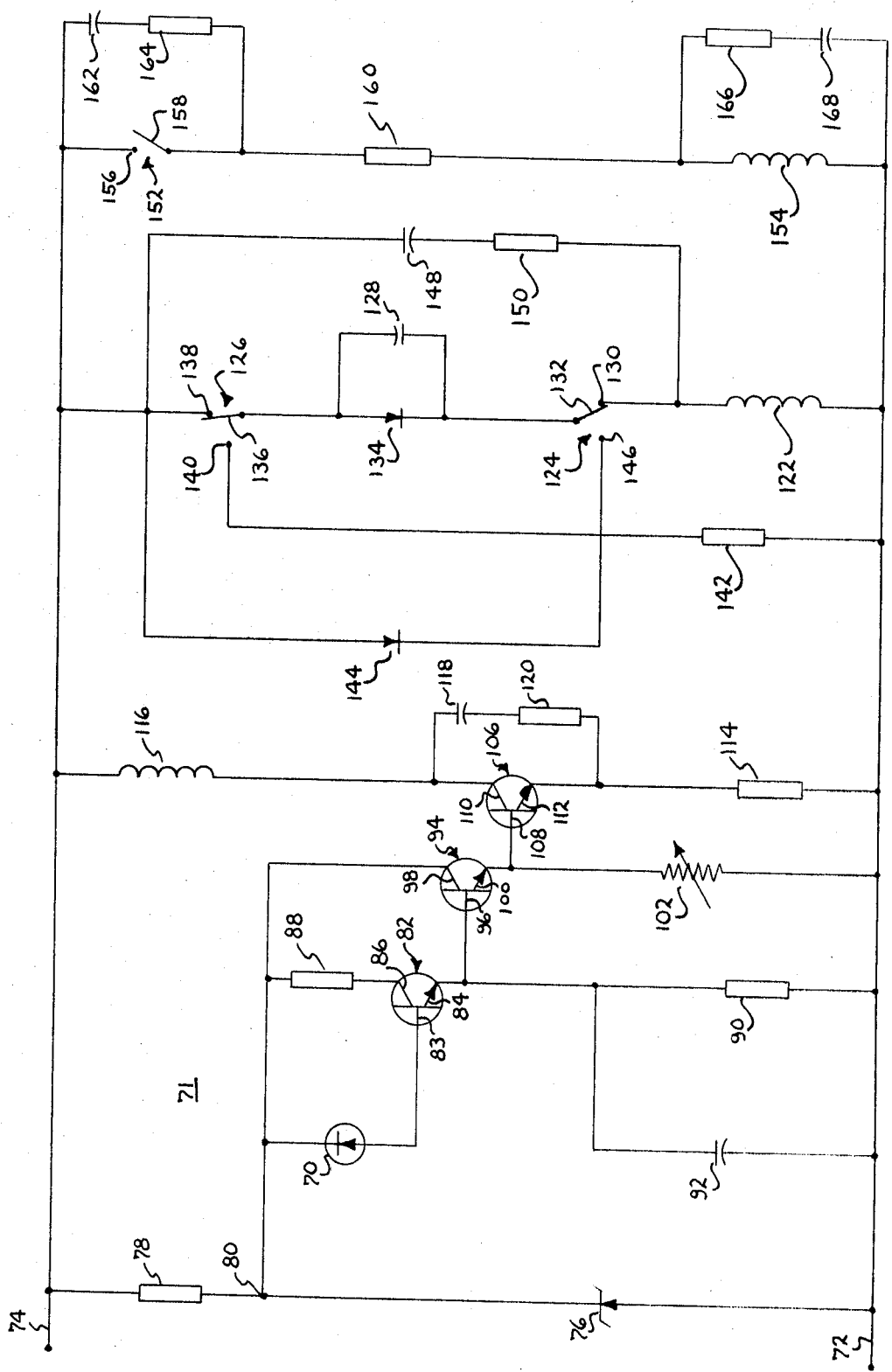
FIG. 2 illustrates a schematic diagram of an additional portion of the wheel slip control arrangement of the present invention including portions thereof which are energized by a low voltage source and switching means for actuating certain control functions.

Attention is now directed to FIG. 2 which illustrates the detection signal amplifier 71 which upon detection of the light signal emitted by the light emitting diode in the sensing circuit actuates the appropriate wheel slip correction circuitry. This comprises a sharp reduction of excitation during the persistence of wheel slip achieved by the introduction of impedance in the field winding of the main generator preferably accompanied by the actuation of the sanding system and also of a control circuit which assures that smooth power recovery occurs at the end of the wheel slip. The wheel slip control arrangement of the preferred embodiment relies solely on digital switching action of the control circuits. Accordingly it is not necessary for the detection signal amplifier to provide outputs varying in response to the amplitude of the levels of the detected signal. The amplifier accordingly does not require complex modulation or threshold sensing circuits. In the preferred embodiment illustrated in FIG. 2 a light sensing diode 70 detects light emitted by the light emitting diode 32, which is illustrated in FIG. 1. Upon such detection and relay 116 is energized and remains energized until light is no longer detected by device 70. This is accomplished by transistors 82, 94 and 106 which are directly coupled in emitter-follower configuration and which are cut off in quiescent operation. The circuit is energized by a source of low voltage potential, such as the battery voltage of a locomotive. Line 74 is connected to the positive terminal and line 72 is connected to the negative terminal of the source. Transistors 82 and 94 are energized from a regulated lower voltage which is provided by line 80 connected to the junction of zener diode 76 and resistor 78 which are serially connected between lines 72 and 74. Collector 86 of transistor 82 is connected through a current limiting resistor 88 to line 80, and emitter 84 is connected through emitter loading resistor 90 to line 72. Light sensing diode 70, which is normally nonconducting, is connected between line 80 and base 83 of device 82. When this diode detects light its conductivity increases so that base current flow is initiated in device 82 which produces an amplified collector current flow. Capacitor 92 connected in parallel across resistor 90 filters out undesirable noise components, and resistor 90 additionally acts to shunt leakage currents produced by the light sensing diode and transistor 82 away from base 96 of transistor 94. Transistor 94 has its collector 98 connected to line 80 and its emitter 100 connected through variable resistance 102 to line 72. The emitter 100 is directly coupled to base 108 of transistor 106. The latter device has its collector 110 connected in series with relay coil 116 to line 74 and has its emitter 112 connected through resistor 114 to line 72. Transistors 82, 94, and 106 conduct during the time period when light sensitive diode detects light emitted by device 32. The resulting collector current of transistor 106 causes actuation of relay 116. Resistor 120 is serially connected with capacitor 118 across emitter 112 and collector 110 to protect transistor 106 by suppressing transients resulting from the inductance of the relay coil. Resistor 114 provides feedback stabilization to reduce the effects of leakage current variations and to reduce the effects of transistor current gain variations resulting from changes in temperature. Variable resistance 102, in the emitter circuit of device 94, is a sensitivity adjustment which adjusts the threshold of conduction of relay 116 to a predetermined minimum current flow through light emitting device 32. Relay 116, which actuates the various control functions should be capable of very rapid actuation and dropout. For example, Mercury-wetted reed relays may be utilized which provide relay actuation and dropout within 3 to 5 milliseconds subsequent to the initiation or interruption of relay current.

Figure 3:
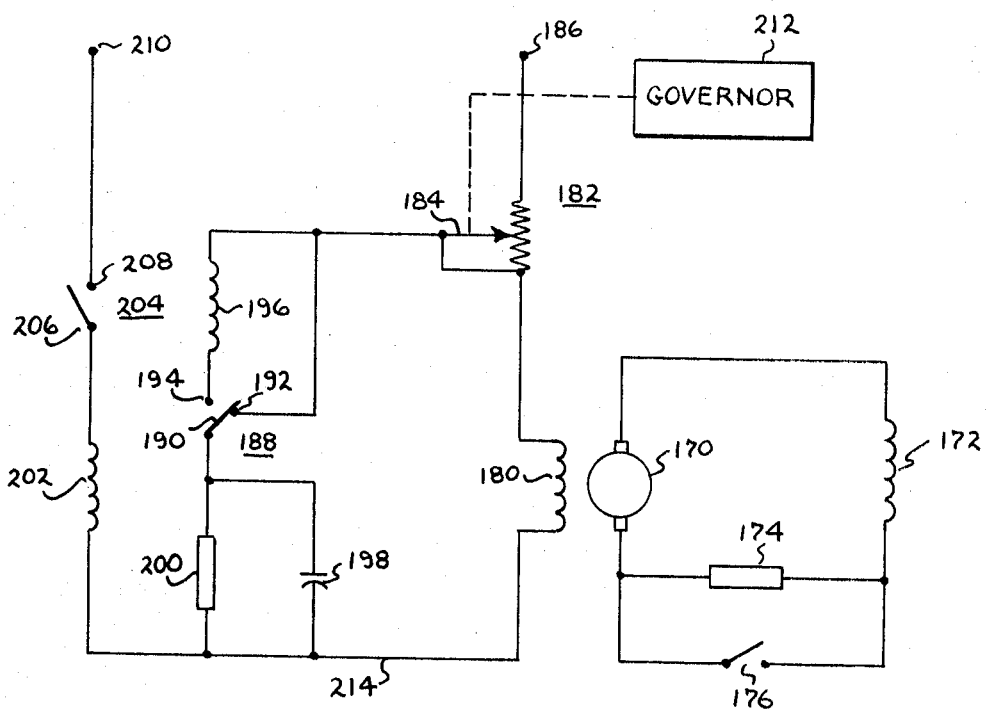
FIG. 3 illustrates a simplified schematic of a switching arrangement for modifying the traction generator field circuit and for controlling the field circuit of an exciter for the traction generator in response to the action of the control arrangements illustrated in FIGS. 1 and 2.

In the preferred embodiment wheel slips are primarily corrected by inserting a resistance in series circuit with the main field of the traction generator. Such arrangements are known in the art and one such arrangement is disclosed, for example, in U.S. Pat. No. 2,328,994 which is assigned to the assignee of the present application. FIG. 3 illustrates a simplified schematic for accomplishing this function. The main field 172 of the traction generator is connected in series circuit with an exciter generator 170 and a resistor 174. The resistor is shunted by a contactor 176. The contactor is closed except during actuation of relay 116. During a wheel slip, resistor 174 is inserted in series circuit with the main field of the traction generator and the exciter. This provides a rapid reduction of traction power. In one specific embodiment the resistor has a resistance of approximately four times the resistance of the traction generator field winding. In the preferred embodiment relay 116 controls an additional relay 122 which incorporates the above-described contactor 176. Contactor 176 is normally closed since relay coil 122 is energized except during actuation of relay 116. Reference is again made to FIG. 2. Relay coil 122 is connected in a series circuit with contactors 124 and 126 and diode 134 across potential lines 72 and 74. Contactors 124 and 126 are associated with relay 116. When relay 116 is deenergized the arm 132 of contactor 124 contacts terminal 130, and arm 136 of contactor 126 contacts terminal 138. Under quiescent conditions current thus flows from line 74 through terminal 138, arm 136, diode 134, arm 132, terminal 130 and relay winding 122 to line 72. Upon actuation of relay winding 116, contact arms 136 and 132 are actuated so as to open the current path through relay coil 122. Resistor 150 and capacitor 148 are connected in series from line 74 to the junction of terminal 130 and relay winding 122 in order to provide arc suppression. As in the case of relay 116, relay 122 should also be fast acting. A relay having adequate current carrying capacity can drop out in less than 16 milliseconds.

It is important that relay 122 by reenergized as rapidly as possible upon the termination of wheel slip, in order to avoid excessive tractive power loss upon termination of wheel slip. A special circuit is provided for this purpose. Diode 144 is connected from line 74 to terminal 146 of contactor 124. Arm 132 of this contactor is connected serially with capacitor 128, connected in parallel with diode 134, to arm 136 of contactor 126 whose terminal 140 is connected through current limiting resistor 142 to line 72. During actuation of relay 116, arm 132 contacts terminal 146 and arm 136 contacts terminal 140 and current flows from line 74 through diode 144, contactor 124, capacitor 128, contactor 126 and the current limiting resistor 142 to line 72. This results in charging capacitor 128 toward the voltage appearing across lines 72 and 74. When relay 116 drops out at the termination of a slip, contactors 124 and 126 reassume their quiescent position so as to reconnect the charged capacitor in series circuit with the relay winding 122 across the low voltage supply line 72 and 74. Accordingly relay winding 122 is actuated by a voltage which approaches twice the voltage appearing across lines 72 and 74. This voltage doubling arrangement provides for very rapid reenergization of relay winding 122 and subsequent fast reclosure of contactor 176.

Upon termination of the wheel slip the traction power should be reapplied smoothly to an appropriate level to prevent surging of the type commonly used in diesel electric locomotives, may provide excessive excitation at the conclusion of a wheel slip particularly if several wheel slips occur in a short time interval. During wheel slip the electrical power demand is sharply reduced. Governor controls of such excitation systems sense that the prime mover is not fully loaded and accordingly provide for a readjustment of the excitation system which results in the application of excess power upon the termination of such a slip. Specifically a vane motor in the governor will be hydraulically actuated so as to readjust the arm of a load control potentiometer to increase the current through a field winding of the exciter. Accordingly, an additional circuit, illustrated in FIG. 3 is actuated during energization of relay winding 116 in order to prevent such over excitation.

The circuit for accomplishing this function is briefly described below and is more fully disclosed in U.S. Pat. No. 3,117,264 which is assigned to the assignee of this application. Reference is again made to FIG. 3. Exciter generator 170 has a shunt field 180 which is connected serially with a variable resistance 182, termed a load control potentiometer, between line 214 and terminal 186. The latter are, respectively, the negative and positive terminals of a source of low voltage. The voltage magnitude appearing between the terminals is representative of the power demand which is placed, by an operator, on the prime mover actuating the generators. The governor 212 controls fuel supplied to the prime mover (which is not illustrated) to control the speed and available power output of the latter. The governor, contains a hydraulic motor arrangement which is mechanically coupled to arm 184 of the load control potentiometer. During normal operation the governor will adjust the resistance of potentiometer 182 and thus the current through field 180 to maintain appropriate loading of the prime mover. The governor senses the reduction of prime mover loading which is caused during wheel slip by the insertion of resistor 174 into the main field-exciter circuit. Normal responsive action would result in movement of arm 184 to the maximum field current position and the application of excessive power to the wheels upon reclosure of contactor 176 at the cessation of the slip. The governor integrally contains an overriding solenoid (not illustrated) which when actuated reduces the setting of the load control potentiometer toward its minimum field current position. The circuit of FIG. 3 provides for actuation of the solenoid for controlled time periods to prevent the load control potentiometer from being adjusted to produce such an undesirable increase of excitation. The solenoid is actuated during energization of relay 202. Relay 202 is energized by closure of contactor 204 which is controlled by relay 196. Relay 202 is connected serially with contactor 204 between low voltage terminals 210 and 214. Upon actuation of relay 196 arm 206 of contactor 204 contacts terminal 208 and energizes relay 202. Actuation of relay 196 is accomplished by contactor 188 which is associated with relay winding 116 illustrated in FIG. 2.

Capacitor 198 and resistor 200 are connected in parallel between line 214 and arm 190 of the contactor 188. When relay 116 is deenergized arm 190 contacts terminal 192 which is connected to arm 184 of the load control potentiometer 182 so that capacitor 198 charges to the potential appearing at arm 184.

Relay coil 196 is connected between arm 184 and terminal 194 of contactor 188. When relay winding 116 is energized arm 190 transfers from terminal 192, to terminal 194. Relay 196 remains initially unenergized since the capacitor 198 potential initially corresponds to the potential at arm 184.

The potential at arm 190 will decrease as capacitor 198 discharges through resistor 200. During wheel slips of substantial duration, relay 196 is actuated when an adequate potential difference thus appears between arm 184 and arm 190. The resulting actuation of the overriding solenoid will cause the governor to reduce the potential on arm 184 until the relay 196 is again disabled. This action is repetitive as the charge on capacitor 198 discharges further. The circuit thus prevents the increase in load potentiometer voltage which would otherwise occur. It should be noted that this circuit merely establishes an appropriate excitation level at the termination of a slip and is not utilized as a primary means of correcting a sensed wheel slip condition.

The wheel slip control arrangement additionally provides for the application of sand to the rails subsequent to a predetermined period or number of slips. Various arrangements of this type are known. One suitable arrangement is disclosed in U.S. Pat. No. 3,093,399 which is assigned to the assignee of the subject application. The circuit for actuating the sanding circuit is illustrated in FIG. 2. Actuation of relay coil 154, which may be a time delay relay, initiates sanding. Coil 154 is connected serially with current limiting resistor 160 and contactor 152 across potential lines 72 and 74. Contactor 152 is associated with relay 116, therefore, arm 158 contacts terminal 156 during actuation of relay 116 so as to energize winding 154. Resistor 164 and capacitor 162 are serially connected across arm 158 and terminal 156 for arc suppression. Resistor 160 prevents the current magnitude from exceeding the current rating of the contactor 152 terminals. Capacitor 168 and resistor 166 are serially connected across relay coil 154. Upon closure of contactor 152, capacitor 168 is charged. The time constant of the capacitor and resistors 160 and 166 are selected to insure that relay coil 154 is actuated for an adequate time period to initiate sanding.

The wheel slip control arrangement described above provides extremely fast detection of slipping wheels and restoration of wheels to the nonslipping state and accordingly provides a smooth low speed operation in mountainous terrain even under adverse track conditions. The arrangement disclosed does not require complex magnetic coupling devices, such as magnetic amplifiers, saturable reactors, or transductors. Accordingly there is no requirement to utilize the alternating current sources or complex and expensive cabling otherwise required when such magnetic coupling devices are utilized. Accordingly, the circuitry described herein could be advantageously utilized even in arrangements which do not utilize the advantageous power tie connection. For example, referring to FIG. 1, the power tie 16 could be eliminated and the junction 13 could be connected to an additional circuit of the type connected to junction 14 including a voltage reference network, voltage sensing circuit and circuit responsive actuating means. Similarly it is possible to substitute a series connected pair of traction motors for the voltage reference network illustrated in FIG. 1. Such an arrangement is equivalent to connecting the rectifying circuit, voltage sensing circuit and circuit responsive actuating means intermediate common junctions 13 and 14, in lieu of the power tie 16. However, the detecting arrangement of the arrangement is inferior to an arrangement providing for comparison of common junction voltage with a fixed reference voltage, because of its inability to assure detection of the simultaneous slippage of a plurality of axles.

Various modifications may be made within the scope of the invention. For example, other forms of gating and actuating devices may be utilized in lieu of the amplifier and relay circuits disclosed in connection with the detection signal amplifier circuit. Similarly, for example, the current responsive actuating means 32 could comprise devices other than light emission devices. Accordingly, various changes, modifications and substitutions may be made in the embodiment described herein without departing from the true scope and spirit of the invention as defined in the appended claims.

What we claim as new and desired to secure by Letters Patent of the United States are:

1. A wheel slip control arrangement for traction vehicles wherein a plurality of pairs of DC series field traction motors are connected in parallel circuit to the output of traction generating means, the traction motors of each pair being connected in series circuit by a common junction comprising:
   a. a power tie interconnecting the common junction of each of a plurality of said pairs of traction motors;
   b. a voltage reference network coupled to the output of said traction generating means and having a voltage reference terminal providing a potential intermediate to the voltage output of said generating means;
   c. a voltage sensing means and circuit responsive actuating means serially connected in circuit between said power tie and said voltage reference terminal;
   d. said voltage sensing means comprising in parallel circuit first means conductive in response to potential differences in excess of a predetermined amplitude between said power tie and said reference terminal and second means conductive in response to the amplitude of at least the first time derivative of potential differences between said power tie and said reference terminal; whereby said current responsive means is actuated during conduction of either said first or second means;
   e. control means connected to reduce the excitation of said traction generating means in response to actuation of said current responsive means.

2. The wheel slip control arrangement as claimed in claim 1, wherein said first means comprises a nonlinear means having a breakdown potential in excess of permissible potential variations resulting from variations in traction motor characteristics and wheel diameters and said second means comprises capacitance means.

3. The wheel slip control arrangement as claimed in claim 2, wherein said second means additionally comprises as low impedance circuit for rapidly discharging said capacitance means upon termination of a wheel slip condition.

4. The wheel slip control arrangement as claimed in claim 2 wherein said current responsive actuating means comprises a light emission device and said control means comprises a light detection device connected in a circuit for modifying the magnitude of excitation of said generating means in response to the light output of said light emission device.

5. The wheel slip control arrangement as claimed in claim 4 wherein said light detection device is connected in a switching circuit energized by a low voltage source, said switching circuit being gated in response to actuation of said light emission device to cause a stepped reduction of the excitation of said traction generator.

6. In a vehicle propulsion arrangement wherein the traction generator has a shunt field connected to the output of an exciter generator, the wheel slip control arrangement as claimed in claim 2, wherein during actuation of said current responsive actuating means said control means causes an impedance to be inserted in series circuit with said shunt field and said output of the exciter generator.

7. In a traction vehicle propulsion arrangement wherein the traction generating means and an excitation generator having an exciting field are driven by a governor controlled prime mover and wherein the exciting field of said excitation generator is connected in circuit with a variable resistance whose magnitude is controlled by the governor to maintain adequate loading of said prime mover, the wheel slip control arrangement as claimed in claim 6 wherein said control means is additionally connected to prevent excessive reduction of said variable resistance during actuation of said current responsive means so as to prevent the application of excessive excitation at the conclusion of wheel slipping.

8. The wheel slipping arrangement of claim 7 wherein said control means additionally initiates track sanding during actuation of said current responsive means.

9. A wheel slip control arrangement for traction vehicles wherein a plurality of pairs of DC series field traction motors are connected in parallel circuit to the output of traction generating means, the traction motors of each pair having a common junction so as to be connected in series circuit, comprising:
   a. a power tie interconnecting the common junctions of each of a plurality of said pairs of traction motors;
   b. a voltage dividing network connected across the output of said traction generating means and having a reference terminal providing a potential intermediate the voltage output of said generating means;
   c. a bridge rectifying circuit having input and output terminals, said input terminals being connected in circuit with said power tie and said reference terminal;
   d. current responsive actuating means;
   e. semiconductor switching means comprising first, second and control electrodes, said first and second electrodes being connected in series circuit with said current responsive means across said output terminals;
   f. capacitance means connected to said control electrode to cause current conduction through said first and second electrodes and to actuate said current responsive means responsive to at least the first time derivative of variations of potential in excess of a predetermined amplitude between said power tie and said reference terminal;
   g. control means responsive to actuation of said current responsive means to reduce the excitation of the traction generating means.

10. The wheel slip control arrangement claimed in claim 9 wherein said current responsive actuating means comprises a light emissive device and said control means comprises a switching circuit, actuated in response to light output from said light emissive device.

11. The wheel slip control arrangement claimed in claim 9 having impedance means connected in parallel circuit with said first and second electrodes to provide current conduction through said current responsive means in response to potential differences in excess of a predetermined magnitude.

12. The wheel slip control arrangement claimed in claim 11 comprising unilaterally conducting means connected in circuit with said capacitance means whereby the latter is rapidly discharged upon termination of a wheel slip condition.

13. A wheel slip control arrangement for traction vehicles wherein a plurality of pairs of DC series field traction motors are connected in parallel circuit to the output of traction generating means, the traction motors of each pair being connected in series circuit by a common junction, comprising:
   a. a bridge rectifying circuit having first and second input terminals, first and second output terminals, said first input terminal being connected to the common junction of at least one of said plurality of pairs of motors;
   b. a voltage reference network coupled to the output of said traction generating means, said network having a voltage reference terminal providing a potential intermediate to that of the voltage output of said generating means;
   c. said second input terminal being connected to said voltage reference terminal;
   d. a light emissive device producing light emission responsive to current flow through the device;
   e. semiconductor switching means comprising first, second, and control electrodes, said first and second electrodes being connected in series circuit with said current responsive means across said first and second output terminals;
   f. capacitance means being connected in circuit between said first output terminal and said control electrode to cause current conduction through said first and second electrodes and said light emissive device responsive to amplitude of at least the first time derivative of the potential difference between said first and second input terminals;
   g. nonlinear impedance means connected in parallel circuit with said first and second electrodes to provide current conduction through said light emissive device in response to a potential difference between said first and second input terminals in excess of a predetermined magnitude;
   h. control means comprising light detection means connected to reduce the excitation of the traction generating means responsive to light emitted from said light emissive device.

14. The wheel slip control arrangement as claimed in claim 13 comprising unilaterally conducting means and impedance means connected serially across said capacitance means, said unilaterally conducting means being poled to rapidly discharge said capacitance means.

15. A wheel slip control arrangement for traction vehicles wherein a plurality of pairs of DC series field traction motors are connected in parallel circuit to the output of traction generating means, the traction motors of each of a plurality of said pairs being connected in series circuit by a common junction, comprising:
   a. a voltage reference network coupled to the output of said traction generating means and having a voltage reference terminal providing a potential intermediate to that of the voltage output of said generating means;
   b. a voltage sensing circuit and current responsive actuating means connected in a series circuit between the common junction of at least one of said pairs of traction motors and said voltage reference terminal;
   c. said voltage sensing means comprising first capacitance means connected to cause conduction of said current responsive actuating means responsive to the amplitude of at least the first time derivative of potential differences between said common junction and said reference terminal whereby said current responsive actuating means has a conducting and nonconducting state;
   d. control means energized by a source of low potential and electrically insulated from said current responsive means comprising:
      1. a relay having a coil connected for actuation during one state of said current responsive means and contactors connected to modify the excitation of said traction generating means in response to a change of state of said current responsive means;
      2. coil actuating means connected to initially increase the potential applied across said coil for a brief initial time period upon a change of state of said current responsive actuating means.

16. The wheel slip control arrangement of claim 15 wherein said coil actuating means comprises:
   a. second capacitance means and unilaterally conducting means connected in parallel circuit;
   b. circuit means connecting said parallel circuit across said low voltage source to charge said second capacitance and disconnecting said coil from said low voltage source during one state of said current responsive means and connecting said parallel circuit in series circuit with said coil across said low voltage source during the other state of said current responsive means;

c. said unilaterally conducting means being poled to permit current conduction when connected in series circuit with said coil across said low voltage source.